United States Patent
Morinaka et al.

(10) Patent No.: US 12,100,799 B2
(45) Date of Patent: Sep. 24, 2024

(54) SOLID ELECTROLYTE, ELECTRODE MIXTURE, SOLID ELECTROLYTE LAYER, AND ALL-SOLID-STATE BATTERY

(71) Applicant: MITSUI MINING & SMELTING CO., LTD., Tokyo (JP)

(72) Inventors: Taizo Morinaka, Ageo (JP); Shigeki Nakayama, Ageo (JP)

(73) Assignee: MITSUI MINING & SMELTING CO., LTD., Tokyo (JP)

( * ) Notice: Subject to any disclaimer, the term of this patent is extended or adjusted under 35 U.S.C. 154(b) by 0 days.

(21) Appl. No.: 17/058,375

(22) PCT Filed: Nov. 18, 2019

(86) PCT No.: PCT/JP2019/045154
§ 371 (c)(1),
(2) Date: Nov. 24, 2020

(87) PCT Pub. No.: WO2020/105604
PCT Pub. Date: May 28, 2020

(65) Prior Publication Data
US 2021/0249682 A1    Aug. 12, 2021

(30) Foreign Application Priority Data

Nov. 19, 2018  (JP) .................................. 2018-216812

(51) Int. Cl.
| | | |
|---|---|---|
| *H01M 10/0562* | (2010.01) | |
| *H01M 4/62* | (2006.01) | |
| *H01M 10/0525* | (2010.01) | |

(52) U.S. Cl.
CPC ......... *H01M 10/0562* (2013.01); *H01M 4/62* (2013.01); *H01M 10/0525* (2013.01); *H01M 2300/0068* (2013.01)

(58) Field of Classification Search
CPC ..... H01M 10/0562; H01M 2300/0068; H01M 4/62; H01M 10/0525
See application file for complete search history.

(56) References Cited

U.S. PATENT DOCUMENTS

| | | | |
|---|---|---|---|
| 10,818,966 B2 | 10/2020 | Utsunot et al. | |
| 2009/0142669 A1* | 6/2009 | Shinohara | C03B 5/06 429/320 |
| 2014/0038058 A1* | 2/2014 | Holzapfel | H01M 4/0471 429/319 |
| 2014/0193693 A1* | 7/2014 | Hoshina | H01M 10/0525 429/149 |
| 2015/0099188 A1* | 4/2015 | Holme | C04B 35/117 429/231.95 |
| 2018/0069262 A1* | 3/2018 | Utsuno | H01M 4/62 |
| 2018/0170756 A1 | 6/2018 | Sato et al. | |
| 2019/0051932 A1* | 2/2019 | Kim | H01M 4/02 |
| 2020/0220208 A1* | 7/2020 | Utsuno | H01M 10/484 |

FOREIGN PATENT DOCUMENTS

| | | | | |
|---|---|---|---|---|
| CN | 107710346 A | | 2/2018 | |
| JP | 2009-158476 | | 7/2009 | |
| JP | 2011-181495 A | | 9/2011 | |
| JP | 2015-048280 | | 3/2015 | |
| JP | 2015076316 | * | 4/2015 | |
| JP | 2018-045997 A | | 3/2018 | |
| WO | 2004/106232 A1 | | 12/2004 | |
| WO | WO-2018020990 A1 | * | 2/2018 | ........ H01M 10/0562 |
| WO | 2018/198494 | | 11/2018 | |

OTHER PUBLICATIONS

International Search Report for PCT/JP2019/045154 mailed Feb. 4, 2020, 5 pages.
Written Opinion of the ISA for PCT/JP2019/045154 mailed Feb. 4, 2020, 3 pages.
Xuefeng et al., "Principles of material forming", Nov. 2013, pp. 399-400 (10 total pages).
Heguo et al., "Principles of composite materials", Jul. 2013, p. 167 (4 total pages).
Wenying et al. "Polymer-based thermally conductive composites", Sep. 2017, Section 3.4.1 Alumina Particles, pp. 57-58 (8 total pages).

* cited by examiner

*Primary Examiner* — Jeremiah R Smith
(74) *Attorney, Agent, or Firm* — NIXON & VANDERHYE

(57) ABSTRACT

A solid electrolyte contains aluminum in an amount of 100 to 1000 ppm, inclusive, on a mass basis, and has lithium ion conductivity. It is preferable that aluminum is derived from an oxide of aluminum. It is also preferable that the solid electrolyte is a sulfide solid electrolyte containing a lithium element, a phosphorus element, and a sulfur element. It is also preferable that the solid electrolyte has an argyrodite-type crystal structure. It is also preferable that the solid electrolyte has a lithium ion conductivity of 4.0 mS/cm or greater.

10 Claims, No Drawings

SOLID ELECTROLYTE, ELECTRODE MIXTURE, SOLID ELECTROLYTE LAYER, AND ALL-SOLID-STATE BATTERY

This application is the U.S. national phase of International Application No. PCT/JP2019/045154 filed Nov. 18, 2019 which designated the U.S. and claims priority to JP Patent Application No. 2018-216812 filed Nov. 19, 2018, the entire contents of each of which are hereby incorporated by reference.

TECHNICAL FIELD

The present invention relates to a solid electrolyte favorably used in an all-solid-state battery.

BACKGROUND ART

All-solid-state batteries do not use flammable organic solvents, and thus allow simplification of safety devices. Moreover, all-solid-state batteries is characterized in not only that they can be excellent in terms of production cost and productivity but also that they can be stacked in series within a cell to provide a higher voltage.

A known example of conventional technologies regarding solid electrolytes is disclosed in Patent Literature 1. Patent Literature 1 discloses a sulfide solid electrolyte material made of a glass-ceramic composed of a lithium halide and an ion conductor containing lithium, phosphorus, and sulfur. This sulfide solid electrolyte material exhibits peaks at $2\theta=20.2°$ and $23.6°$ in X-ray diffraction measurement using CuKα radiation, and further contains at least one of $Al_2O_3$, $ZrO_3$, $TiO_2$, and $SiO_2$. Patent Literature 1 purports that this sulfide solid electrolyte material has a high level of lithium ion conductivity. Patent Literature 1 also disclosed that the amount of $Al_2O_3$ contained in the sulfide solid electrolyte material is less than 7 wt %, and actually, the $Al_2O_3$ content is at least 2 wt %.

CITATION LIST

Patent Literature

Patent Literature 1: JP 2015-76316A

SUMMARY OF INVENTION

As proposed in Patent Literature 1 for example, sulfide solid electrolytes having a high level of lithium ion conductivity have been proposed in recent years. However, there is demand for a further improvement in lithium ion conductivity.

Therefore, an object of the present invention is to provide a solid electrolyte having improved lithium ion conductivity compared with the conventional technologies as described above.

The present invention provides a solid electrolyte containing aluminum in an amount of 100 to 1000 ppm by mass, inclusive, and having lithium ion conductivity.

The present invention also provides an electrode mixture containing the above-described solid electrolyte and an active material. The present invention also provides an all-solid-state battery containing the above-described solid electrolyte.

DESCRIPTION OF EMBODIMENTS

Hereinafter, the present invention will be described by way of preferred embodiments thereof. The solid electrolyte of the present invention includes a material having lithium ion conductivity in a solid state (hereinafter also referred to as "lithium ion conductive material"). The solid electrolyte of the present invention has, preferably at room temperature (i.e., 25° C.), a lithium ion conductivity of preferably 4.0 mS/cm or greater, more preferably 4.2 mS/cm or greater, even more preferably 5.0 mS/cm or greater, still more preferably 5.5 mS/cm or greater, and particularly preferably 6.0 mS/cm or greater. The lithium ion conductivity can be measured using a method specified in Examples, which will be described later.

As the lithium ion conductive material, a material known in the art is used. Examples thereof include an oxide solid electrolyte, a nitride solid electrolyte, a boron solid electrolyte, and a sulfide solid electrolyte. These lithium ion conductive materials can be used singly or in a combination of two or more thereof.

Examples of the oxide solid electrolyte include a garnet-type, a NASICON-type, a LISICON-type, and a perovskite-type. Specific examples of the compositions thereof include $La_{0.57}Li_{0.29}TiO_3$, $Li_7La_3Zr_2O_{12}$, $La_{0.51}Li_{0.34}Ti_{2.94}$, $Li_{14}Zn(GeO_4)_4$, $La_{0.5}Li_{0.5}TiO_3$, $Li_{3.6}Si_{0.6}P_{0.4}O_4$, $Li_{3.4}V_{0.6}Ge_{0.4}O_4$, $Li_{2.9}PO_{3.3}N_{0.46}Li_3(In_{0.9}Nb_{0.1})(PO_4)_3$, $Li_3PO_4$, $LiTi_{0.5}Zr_{1.5}(PO_4)_3$, $LiTi_2(PO_4)_3$, $LiZr_2(PO_4)_3$, $LiGe_2(PO_4)_3$, $Li_6La_2BaTa_2O_{12}$, $Li_{5.5}La_3Nb_{1.75}In_{0.25}O_{12}$, $Li_5La_3Ta_2O_{12}$, and $Li_3OCl_{0.5}Br_{0.5}$. Examples of the nitride solid electrolyte and the boron solid electrolyte other than the sulfide or oxide solid electrolytes include $Li_3N$, $LiBH_4$, and $Li_2B_{12}H_{12}$.

An example of the sulfide solid electrolyte is a solid electrolyte containing a lithium element, a phosphorus element, and a sulfur element. In view of improving the ionic conductivity, it is particularly preferable to use a solid electrolyte containing a lithium element, a phosphorus element, a sulfur element, and a halogen element. The sulfide solid electrolyte may also contain another element in addition to the lithium element, the phosphorus element, the sulfur element, and the halogen element. For example, it is possible to replace part of the lithium element with another alkali metal element, replace part of the phosphorus element with another pnictogen element, and replace part of the sulfur element with another chalcogen element.

In view of improving the lithium ion conductivity even more, it is particularly preferable that the sulfide solid electrolyte be made of a material having an argyrodite-type crystal structure. An argyrodite-type crystal structure refers to the crystal structure of a group of compounds derived from a mineral represented by the chemical formula $Ag_8GeS_6$. In view of improving the ion conductivity yet even more, it is particularly preferable that the sulfide solid electrolyte having an argyrodite-type crystal structure have a crystal structure belonging to the cubic crystal system.

In the sulfide solid electrolyte having an argyrodite-type crystal structure, one or more elements selected from the group consisting of fluorine (F), chlorine (Cl), bromine (Br), and iodine (I) can be used as a halogen contained therein. In view of improving the ionic conductivity, it is particularly preferable to use a combination of chlorine and bromine as the halogen.

In view of improving the ionic conductivity even more, it is particularly preferable that the sulfide solid electrolyte having an argyrodite-type crystal structure be a compound represented by, for example, a compositional formula $Li_{7-a-2b}PS_{6-a-b}X_a$, wherein X represents at least one of the fluorine (F) element, the chlorine (Cl) element, the bromine (Br) element, and the iodine (I) element. The fluorine (F) element, the chlorine (Cl) element, the bromine (Br) element, and the iodine (I) element can be given as examples of the halogen element in the compositional formula above, and the halogen element may be one of these elements or a combination of two or more thereof.

In the above-described compositional formula, a represents the molar ratio of the halogen element (X) and is preferably from 0.4 to 2.2. When a is within this range, the cubic argyrodite-type crystal structure is stable at temperatures near room temperature (25° C.), and the conductivity of lithium ions can be increased. From this point of view, a is more preferably from 0.5 to 2.0, particularly preferably from 0.6 to 1.8, and yet more preferably from 0.7 to 1.6.

In the above-described compositional formula, b represents a value indicating how much smaller the amount of the $Li_2S$ component is than that in the stoichiometric composition. The value of b preferably satisfies $-0.9 \leq b \leq a+2$, because this makes the cubic argyrodite-type crystal structure stable at temperatures near room temperature (25° C.) and increases the lithium ion conductivity. In particular, in view of improving the moisture resistance of the cubic argyrodite-type crystal structure, b more preferably satisfies $-a+0.4 \leq b$, and even more preferably satisfies $-a+0.9 \leq b$.

Whether or not a sulfide solid electrolyte has an argyrodite-type crystal structure can be confirmed by XRD measurement, for example. Specifically, in an X-ray diffraction pattern measured with an X-ray diffractometer (XRD) using CuKα1 radiation, a crystalline phase having an argyrodite-type structure has characteristic peaks at $2\theta=15.340\pm1.000$, $17.740\pm1.000$, $25.190\pm1.000$, $29.620\pm1.000$, $30.970\pm1.000$, $44.370\pm1.00°$, $47.22°\pm1.00°$, and $51.70°\pm1.00°$. Furthermore, a crystalline phase having an argyrodite-type structure also has characteristic peaks at, for example, $2\theta=54.260\pm1.00°$, $58.35°\pm1.00°$, $60.72°\pm1.00°$, $61.50°\pm1.00°$, $70.46°\pm1.00°$, and $72.61°\pm1.00°$. On the other hand, if it is confirmed that a sulfide solid electrolyte does not exhibit the above-described peaks characteristic of a crystalline phase having an argyrodite-type structure, it is determined that the sulfide solid electrolyte does not contain a crystalline phase having an argyrodite-type structure.

A sulfide solid electrolyte having an argyrodite-type crystal structure means that the sulfide solid electrolyte has at least a crystalline phase having an argyrodite-type structure. In the present invention, it is preferable that the sulfide solid electrolyte have a crystalline phase having an argyrodite-type structure as the main phase. In this case, the "main phase" refers to a phase that accounts for the largest proportion of the total amount of all of the crystalline phases constituting the sulfide solid electrolyte. Accordingly, the proportion of a crystalline phase having an argyrodite-type structure contained in the sulfide solid electrolyte to all of the crystalline phases constituting the sulfide solid electrolyte is, for example, preferably 60 mass % or greater, or in particular, more preferably 70 mass % or greater, 80 mass % or greater, or 90 mass % or greater. The proportion of a crystalline phase can be determined through XRD, for example.

In the solid electrolyte of the present invention, the above-described various lithium ion conductive materials are in the form of powder, which is a collection of particles. In view of improving the lithium ion conductivity, the cumulative volume particle diameter $D_{50}$ at a cumulative volume of 50 vol % of the lithium ion conductive material is, for example, preferably 0.1 μm or greater, particularly preferably 0.3 μm or greater, and more particularly preferably 0.5 μm or greater, as measured through particle size distribution analysis using a laser diffraction and scattering method. The cumulative volume particle size $D_{50}$ is, for example, preferably 20 μm or less, particularly preferably 10 μm or less, and more particularly preferably 5 μm or less. When the lithium ion conductive material has a cumulative volume particle size $D_{50}$ of 0.1 μm or greater, an increase in the total surface area of the powder of the solid electrolyte is suppressed, and therefore, the problems such as an increase in resistance and difficulty in mixing the lithium ion conductive material with an active material are unlikely to arise. On the other hand, in the case where, for example, the solid electrolyte of the present invention is used in combination with another solid electrolyte, the solid electrolyte of the present invention can easily fit into gaps and the like of the other solid electrolyte when the lithium ion conductive material has a cumulative volume particle size $D_{50}$ of 20 μm or less. This results in an increase in the contact points and the contact areas between the solid electrolytes, and the lithium ion conductivity can be effectively improved.

The solid electrolyte of the present invention contains aluminum, in addition to the above-described lithium ion conductive material. In the solid electrolyte, aluminum is preferably contained in the form of an aluminum compound. In other words, it is preferable that in the solid electrolyte, aluminum should not be present in the form of metallic aluminum. It is also preferable that in the lithium ion conductive material, aluminum should not be present as a constituent element of the lithium ion conductive material. In the solid electrolyte of the present invention, the aluminum compound contained is preferably in the form of independent particles.

Examples of the above-described aluminum compound include inorganic compounds such as oxides of aluminum: $Al_2O_3$, AlO, and $Al_2O$. Out of these oxides of aluminum, $Al_2O_3$ is preferably used in view of improving the ionic conductivity. That is to say, it is preferable that aluminum contained in the solid electrolyte of the present invention is derived from $Al_2O_3$. $Al_2O_3$ may have crystal structures of α-alumina or γ-alumina, for example. Out of these crystal structures, α-alumina is preferably used in view of improving the ionic conductivity.

The reason why the ionic conductivity of the solid electrolyte of the present invention is improved by incorporating an aluminum compound therein is not clear; however, the inventors of the present invention thinks that the reason is as follows. Since the solid electrolyte of the present invention contains particles of the lithium ion conductive material and particles of an aluminum compound, the particles of the lithium ion conductive material are separated by the particles of the aluminum compound. As a result, the particles of the lithium ion conductive material are less likely to aggregate, and the dispersibility of the particles thereof thus improves. Consequently, the particles of the lithium ion conductive material can form uniform ion conduction paths in all directions, and it can be considered that the ion conductivity improves as a result.

As studies conducted by the inventor of the present invention, the inventor has found that, in view of improving the ionic conductivity of the solid electrolyte of the present invention even more, it is advantageous to appropriately adjust the content of the aluminum compound in the solid electrolyte. In particular, it has been found that adding a minute amount of an aluminum compound is sufficient to improve the ionic conductivity of the solid electrolyte of the present invention. If the content of the aluminum compound is excessively large, ion conduction paths will be blocked, and it will thus not be easy to sufficiently increase the ionic conductivity of the solid electrolyte of the present invention. In view of this, the solid electrolyte of the present invention contains aluminum in an amount of 100 to 1000 ppm by mass, inclusive. In particular, the amount of aluminum contained in the solid electrolyte of the present invention is, for example, preferably 180 ppm by mass or greater, and more preferably 190 ppm by mass or greater. On the other hand, the amount of aluminum contained in the solid electrolyte of the present invention is, for example, preferably 710 ppm by mass or less, and more preferably 590 ppm by mass or less. The content of aluminum in the solid electrolyte of the present invention can be measured through ICP atomic emission spectroscopy.

The content of aluminum in the solid electrolyte of the present invention is, for example, preferably 180 ppm or greater, more preferably 340 ppm or greater, and even more preferably 360 ppm or greater, in terms of $Al_2O_3$. On the other hand, the content of aluminum in the solid electrolyte of the present invention is, for example, preferably 2000 ppm or less, more preferably 1500 ppm or less, and even more preferably 1200 ppm or less, in terms of $Al_2O_3$. The content in terms of $Al_2O_3$ can be calculated from the content (by mass) of aluminum measured through ICP atomic emission spectroscopy.

The solid electrolyte of the present invention may also contain unavoidable impurities, in addition to the lithium ion conductive material and aluminum. The amount of unavoidable impurities contained in the solid electrolyte is preferably such an amount that does not impair the effects of the present invention. For example, the amount of unavoidable impurities is preferably less than 5 mol %, more preferably less than 3 mol %, and even more preferably less than 1 mol %.

The solid electrolyte of the present invention can be easily obtained by, for example, precisely mixing particles of a lithium ion conductive material and particles of an aluminum compound in a predetermined ratio (hereinafter referred to as the method (a)). As the specific method for precise mixing, a common precise mixing method may be used, which is included within the common knowledge of those skilled in the art, and therefore, the description thereof is not given here. Alternatively, the intended solid electrolyte may be obtained by wet grinding particles of a lithium ion conductive material using a medium made of alumina to thereby mixing a minute amount of alumina as impurities with the particles of the lithium ion conductive material (hereinafter referred to as the method (b)). For the case where it is desired that a large amount of the aluminum element be contained in the solid electrolyte of the present invention, the method (a) is advantageous, and the method (b) followed by the method (a) is also advantageous. On the other hand, for the case where it is desired that a small amount of the aluminum element be contained in the solid electrolyte of the present invention, the method (b) is advantageous. In the method (b), if an extremely powerful mechanical grinding and mixing such as mechanical alloying is performed, the resulting lithium ion conductive material has a low crystallinity or is amorphous, and as a result, the lithium ion conductive material may be electron-conductive. In order to prevent this, it is desirable to perform the wet grinding with such an amount of energy that allows the lithium ion conductive material to maintain its crystallinity.

The method (b) performed under appropriate wet grinding conditions enables the aluminum element to be contained in the solid electrolyte in an intended amount. Examples of the wet grinding conditions include, but are not limited to, the concentration of a slurry composed of particles of the lithium ion conductive material and a solvent, the diameter of alumina beads, the purity of the alumina beads, the peripheral speed of a grinder, and the circulation velocity of the slurry.

The lithium ion conductive material contained in the solid electrolyte of the present invention can be produced using an appropriate method according to the type thereof. For example, a sulfide material having an argyrodite-type crystal structure as the lithium ion conductive material can be produced by mixing a lithium sulfide ($Li_2S$) powder, a diphosphorus pentasulfide ($P_2S_5$) powder, and a lithium chloride (LiCl) powder and/or a lithium bromide (LiBr) powder so as to satisfy a predetermined molar ratio between the lithium element, the phosphorus element, the sulfur element, and the halogen element contained in the mixture, and then firing the mixture in an inert gas atmosphere or in an atmosphere containing hydrogen sulfide gas. The atmosphere containing hydrogen sulfide gas may be an atmosphere of 100% hydrogen sulfide gas or may be an atmosphere of a gas mixture of hydrogen sulfide gas and an inert gas such as argon. The firing temperature is preferably from 350° C. to 550° C., for example. The retention time at this temperature is preferably from 0.5 to 20 hours, for example.

The thus obtained solid electrolyte of the present invention can be used as a material for forming a solid electrolyte layer or a material to be contained in an electrode mixture containing an active material, for example. Specifically, the solid electrolyte can be used for a positive electrode mixture for forming a positive electrode layer containing a positive electrode active material or a negative electrode mixture for forming a negative electrode layer containing a negative electrode active material. Thus, the solid electrolyte of the present invention can be used in a battery having a solid electrolyte layer, or a so-called all-solid-state battery. More specifically, the solid electrolyte can be used in a lithium all-solid-state battery. The lithium all-solid-state battery may be a primary battery or a secondary battery, but the solid electrolyte is preferably used in a lithium secondary battery.

The all-solid-state battery of the present invention has a positive electrode layer, a negative electrode layer, and a solid electrolyte layer between the positive electrode layer and the negative electrode layer, and has the solid electrolyte of the present invention. Regarding the shape, the all-solid-state battery of the present invention may be a laminate-type, cylindrical, or rectangular battery, for example.

The solid electrolyte layer of the present invention can be produced using, for example, a method in which a slurry containing the solid electrolyte, a binder, and a solvent is dripped onto a substrate and leveled off with a doctor blade or the like; a method in which the substrate and the slurry are brought into contact with each other, followed by cutting with an air knife; or a method in which a coating is formed of the slurry through screen printing or the like, followed by removing the solvent by heat drying. Alternatively, the solid electrolyte layer can be produced by pressing a powder of the solid electrolyte of the present invention and then processing the resultant as appropriate. The solid electrolyte layer of the present invention may also contain another solid electrolyte, in addition to the solid electrolyte of the present invention. Typically, the thickness of the solid electrolyte layer of the present invention is preferably from 5 to 300 µm, and more preferably from 10 to 100 µm.

The positive electrode mixture of the all-solid-state battery containing the solid electrolyte of the present invention contains a positive electrode active material. As the positive electrode active material, materials that are used as positive electrode active materials for lithium secondary batteries, for example, can be used as appropriate. Examples of the positive electrode active material include a spinel-type lithium transition metal compound, and a lithium metal oxide having a layered structure. The positive electrode mixture may also contain other materials, including a conductive assistant, in addition to the positive electrode active material.

The negative electrode mixture of the all-solid-state battery containing the solid electrolyte of the present invention contains a negative electrode active material. As the negative electrode active material, materials that are used as negative electrode active materials for lithium secondary batteries, for example, can be used as appropriate. Examples of the negative electrode active material include lithium metals, carbon materials such as artificial graphite, natural graphite, and non-graphitizable carbon (hard carbon), silicon, silicon compounds, tin, and tin compounds. The negative electrode mixture may also contain other materials, including a conductive assistant, in addition to the negative electrode active material.

EXAMPLES

Hereinafter, the present invention will be described in greater detail by way of examples. However, the scope of the present invention is not limited to the examples below. Hereinafter, "%" means "mass %" unless otherwise specified.

Example 1

A $Li_2S$ powder, a $P_2S_5$ powder, a LiCl powder, and LiBr powder were weighed so that the composition shown in Table 1 below was realized, provided that the total amount of the powders was 75 g. These powders were ground and mixed using a ball mill to obtain a powder mixture. The powder mixture was fired to obtain a fired product having the composition shown in Table 1. The firing was performed at 500° C. for 4 hours using a tubular electric furnace. During the firing, 100% pure hydrogen sulfide gas was circulated in the electric furnace at 1.0 L/min. The fired product was disintegrated using a mortar and a pestle, and subsequently coarsely ground using a wet bead mill (zirconia beads having a diameter of 1 mm). The coarsely-ground, fired product was finely ground using a wet bead mill (Picomill, model number: PCM-LR, manufactured by Asada Iron Works, Co., Ltd.). For the fine grinding using the wet bead mill, high-purity α-alumina beads (manufactured by Taimei Chemicals Co., Ltd., product type: TB-03, purity of $Al_2O_3$: 99.99% or more) having a diameter of 0.3 mm were used. In the fine grinding, the slurry concentration was 20%, the peripheral speed was 6 m/s, and the circulation velocity was 200 ml/min. The fine grinding time was adjusted to between 30 and 120 minutes, inclusive, so that the content of aluminum in the solid electrolyte satisfied the value shown in Table 1. The finely-ground, fired product was subjected to solid-liquid separation and then dried. The dried fired product was passed through a sieve with a mesh size of 75 μm to obtain an intended solid electrolyte powder.

Example 2

A $Li_2S$ powder, a $P_2S_5$ powder, a LiCl powder, and a LiBr powder were weighed so that the composition shown in Table 1 below was realized, provided that the total amount of the powders was 75 g. Moreover, the time for the fine grinding was adjusted to between 30 and 120 minutes, inclusive, so that the content of aluminum in the solid electrolyte satisfied the value shown in Table 1. Otherwise, the same procedure as that of Example 1 was performed, and thus, a solid electrolyte powder was obtained.

Example 3

A $Li_2S$ powder, a $P_2S_5$ powder, and a LiCl powder were weighed so that the composition shown in Table 1 below was realized, provided that the total amount of the powders was 75 g. Moreover, the time for the fine grinding was adjusted to between 30 and 120 minutes, inclusive, so that the content of aluminum in the solid electrolyte satisfied the value shown in Table 1. Otherwise, the same procedure as that of Example 1 was performed, and thus, a solid electrolyte powder was obtained.

Example 4

A $Li_2S$ powder, a $P_2S_5$ powder, a LiCl powder, and a LiBr powder were weighed so that the composition shown in Table 1 below was realized, provided that the total amount of the powders was 75 g. Moreover, the time for the fine grinding was adjusted to between 30 and 120 minutes, inclusive, so that the content of aluminum in the solid electrolyte satisfied the value shown in Table 1. Otherwise, the same procedure as that of Example 1 was performed, and thus, a solid electrolyte powder was obtained.

Example 5

A $Li_2S$ powder, a $P_2S_5$ powder, a LiCl powder, and a LiBr powder were weighed so that the composition shown in Table 1 below was realized, provided that the total amount of the powders was 75 g. Moreover, for the fine grinding using the wet bead mill, low-purity α-alumina beads (manufactured by Hira Ceramics Co., Ltd., product type: AL9-20, purity of $Al_2O_3$: 99.57%) having a diameter of 0.3 mm were used, and the fine grinding was performed at a peripheral speed of 8 m/s. The time for the fine grinding was adjusted to between 30 and 120 minutes, inclusive, so that the content of aluminum in the solid electrolyte satisfied the value shown in Table 1. Otherwise, the same procedure as that of Example 1 was performed, and thus, a solid electrolyte powder was obtained.

Example 6

A $Li_2S$ powder, a $P_2S_5$ powder, a LiCl powder, and a LiBr powder were weighed so that the composition shown in Table 1 below was realized, provided that the total amount of the powders was 75 g. Moreover, the time for the fine grinding was adjusted to between 30 and 120 minutes, inclusive, so that the content of aluminum in the solid electrolyte satisfied the value shown in Table 1. Otherwise, the same procedure as that of Example 5 was performed, and thus, a solid electrolyte powder was obtained.

Example 7

9.996 g of the solid electrolyte powder obtained in Example 1 and 0.004 g of an α-alumina powder having a diameter of 0.3 mm were used. These powders were precisely mixed by passing them through a sieve with a mesh size of 75 μm three times. Thus, a solid electrolyte powder was obtained.

Example 8

A $Li_2S$ powder, a $P_2S_5$ powder, a LiCl powder, and a LiBr powder were weighed so that the composition shown in Table 1 below was realized, provided that the total amount of the powders was 75 g. Moreover, in the fine grinding, the slurry concentration was 10%. The time for the fine grinding time was adjusted to between 30 and 120 minutes, inclusive, so that the content of aluminum in the solid electrolyte satisfied the value shown in Table 1. Otherwise, the same procedure as that of Example 5 was performed, and thus, a solid electrolyte powder was obtained.

Example 9

A $Li_2S$ powder, a $P_2S_5$ powder, and a LiCl powder were weighed so that the composition shown in Table 1 below was realized, provided that the total amount of the powders was 75 g. Moreover, the time for the fine grinding was adjusted to between 30 and 120 minutes, inclusive, so that the content of aluminum in the solid electrolyte satisfied the value shown in Table 1. Otherwise, the same procedure as that of Example 8 was performed, and thus, a solid electrolyte powder was obtained.

Comparative Example 1

A solid electrolyte powder was obtained by the same procedure as that of Example 1, except that the slurry concentration was 30% in the fine grinding.

Comparative Example 2

A solid electrolyte powder was obtained by the same procedure as that of Example 1, except that, for the fine grinding using the wet bead mill, low-purity α-alumina beads (manufactured by Hira Ceramics Co., Ltd., product type: AL9-20, purity of $Al_2O_3$: 99.57%) having a diameter of 0.3 mm were used, and that in the fine grinding, the slurry concentration and the peripheral speed were 5% and 10 m/s, respectively.

Comparative Example 3

9.789 g of the solid electrolyte powder obtained in Example 1 and 0.211 g of an α-alumina powder having a diameter of 0.3 mm were used. These powders were precisely mixed by passing them through a sieve with a mesh size of 75 μm three times. Thus, a solid electrolyte powder was obtained.

Evaluation

For each of the solid electrolytes obtained in the examples and the comparative examples, the content of the aluminum element in the solid electrolyte was measured through ICP atomic emission spectroscopy, and based on the content of the aluminum element, the content of $Al_2O_3$ in the solid electrolyte was calculated. Furthermore, the ionic conductivity was measured using the method specified below. Table 1 shows the results.

Measurement of Ionic Conductivity

Each of the solid electrolyte powders obtained in the examples and the comparative examples was compacted through uniaxial pressing in a glovebox purged with sufficiently dry Ar gas (having a dew point of −60° C. or lower). Furthermore, the resultant was compacted at 200 MPa using a cold isostatic pressing machine, to thereby prepare a pellet having a diameter of 10 mm and a thickness of about 4 to 5 mm. A carbon paste was applied to both upper and lower sides of the pellet to form electrodes on both sides, and the resulting pellet was then heat-treated at 180° C. for 30 minutes, to thereby produce a sample for ionic conductivity measurement. The lithium ion conductivity of the sample was measured using a Solartron 1255B from TOYO Corporation. The measurement was performed using the AC impedance method under the conditions of a temperature of 25° C. and a frequency of 0.1 Hz to 1 MHz.

TABLE 1

| | Composition of solid electrolyte | Content of aluminum element (ppm) | Content in terms of $Al_2O_3$ (ppm) | Ionic conductivity (mS/cm) |
|---|---|---|---|---|
| Ex. 1 | $Li_{5.4}PS_{4.4}Cl_{0.8}Br_{0.8}$ | 180 | 340 | 5.7 |
| Ex. 2 | $Li_{5.4}PS_{4.4}Cl_{1.0}Br_{0.6}$ | 190 | 359 | 7.0 |
| Ex. 3 | $Li_{5.4}PS_{4.4}Cl_{1.6}$ | 250 | 472 | 6.8 |
| Ex. 4 | $Li_{5.6}PS_{4.6}Cl_{1.0}Br_{0.4}$ | 280 | 529 | 6.3 |
| Ex. 5 | $Li_{5.6}PS_{4.6}Cl_{0.8}Br_{0.6}$ | 330 | 624 | 7.8 |
| Ex. 6 | $Li_{5.6}PS_{4.6}Cl_{0.6}Br_{0.8}$ | 460 | 869 | 6.9 |
| Ex. 7 | $Li_{5.4}PS_{4.4}Cl_{0.8}Br_{0.8}$ | 580 | 1096 | 6.2 |
| Ex. 8 | $Li_{5.4}PS_{4.4}Cl_{0.9}Br_{0.7}$ | 590 | 1115 | 6.8 |
| Ex. 9 | $Li_{5.6}PS_{4.6}Cl_{1.4}$ | 710 | 1342 | 5.5 |
| Com. Ex. 1 | $Li_{5.4}PS_{4.4}Cl_{0.8}Br_{0.8}$ | 50 | 94 | 2.0 |
| Com. Ex. 2 | $Li_{5.4}PS_{4.4}Cl_{0.8}Br_{0.8}$ | 1100 | 2078 | 3.8 |
| Com. Ex. 3 | $Li_{5.4}PS_{4.4}Cl_{0.8}Br_{0.8}$ | 11000 | 20780 | 3.0 |

As is clear from the results shown in Table 1, the solid electrolytes of the examples, which had a content of the aluminum element within a specific range, exhibited dramatically improved ionic conductivities compared with the solid electrolytes of the comparative examples, which had a content of the aluminum element outside the specific range.

INDUSTRIAL APPLICABILITY

According to the present invention, a solid electrolyte having improved lithium ion conductivity is provided.

The invention claimed is:

1. A sulfide solid electrolyte a lithium ion conductive material having an argyrodite-type crystal structure and containing a lithium element, a phosphorus element, and a sulfur element, and
    an aluminum compound,
    wherein the sulfide solid electrolyte contains aluminum in an amount of 100 to 1000 ppm by mass,
    wherein the aluminum compound comprises an oxide,
    wherein a cumulative volume particle diameter D50 at a cumulative volume of 50 vol % of the lithium ion conductive material is 0.1 μm or greater and 20 μm or less, as measured through particle size distribution analysis using a laser diffraction and scattering method,
    wherein the oxide comprises at least one member selected from the group consisting of $Al_2O_3$, AlO and $Al_2O$,
    wherein the sulfide solid electrolyte has a lithium ion conductivity of 4.2 mS/cm or greater,
    wherein the oxide is $Al_2O_3$ having a crystal structure of α-alumina, and
    wherein the sulfide solid electrolyte contains aluminum in an amount of 180 to 710 ppm by mass.

2. An electrode mixture containing the sulfide solid electrolyte according to claim 1 and an active material.

3. A solid electrolyte layer containing the sulfide solid electrolyte according to claim 1.

4. An all-solid-state battery containing the sulfide solid electrolyte according to claim 1.

5. The sulfide solid electrolyte according to claim 1, further comprising a halogen element.

6. The sulfide solid electrolyte according to claim 5, wherein the halogen element is at least one member selected from the group consisting of fluorine, chloride, bromide and iodine.

7. The sulfide solid electrolyte according to claim 5, wherein a molar ratio of the halogen element to said lithium ion conductive material is in a range of 0.4 to 2.2.

8. The sulfide solid electrolyte according to claim 1, wherein a cumulative volume particle diameter D50 at a cumulative volume of 50 vol % of the lithium ion conductive material is 0.1 μm or greater and 10 μm or less, as measured through particle size distribution analysis using a laser diffraction and scattering method.

9. The sulfide solid electrolyte according to claim 1, wherein a cumulative volume particle diameter D50 at a cumulative volume of 50 vol % of the lithium ion conductive material is 0.5 μm or greater and 10 am or less, as measured through particle size distribution analysis using a laser diffraction and scattering method.

10. The sulfide solid electrolyte according to claim 1, wherein the lithium ion conductive material has a compositional formula $Li_{7-a-2b}PS_{6-a-b}X_a$, wherein X represents at least one of fluorine, chlorine, bromine and iodine, a is from 0.7 to 1.6, and b satisfies $-a+0.9 \leq b$.

* * * * *